United States Patent
Watanabe et al.

(10) Patent No.: US 11,405,411 B2
(45) Date of Patent: Aug. 2, 2022

(54) EXTRACTION APPARATUS, EXTRACTION METHOD, COMPUTER READABLE MEDIUM

(71) Applicant: NEC Corporation, Tokyo (JP)

(72) Inventors: Toshiki Watanabe, Tokyo (JP); Satoru Yamano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 378 days.

(21) Appl. No.: 16/493,930

(22) PCT Filed: Mar. 31, 2017

(86) PCT No.: PCT/JP2017/013588
§ 371 (c)(1),
(2) Date: Sep. 13, 2019

(87) PCT Pub. No.: WO2018/179329
PCT Pub. Date: Oct. 4, 2018

(65) Prior Publication Data
US 2021/0126925 A1 Apr. 29, 2021

(51) Int. Cl.
*H04L 9/40* (2022.01)
*G06K 9/62* (2022.01)
*H04L 41/16* (2022.01)

(52) U.S. Cl.
CPC ........ *H04L 63/1416* (2013.01); *G06K 9/6267* (2013.01); *H04L 41/16* (2013.01);
(Continued)

(58) Field of Classification Search
USPC ........................................................ 726/22
See application file for complete search history.

(56) References Cited

U.S. PATENT DOCUMENTS 6,704,874 B1 * 3/2004 Porras ................. H04L 63/1458
709/224
8,307,433 B2 * 11/2012 Yue ....................... G06F 21/554
713/168
(Continued)

FOREIGN PATENT DOCUMENTS

JP          2013-232716 A    11/2013
WO         2016/092834 A1     6/2016
WO      WO-2016092834 A1 *    6/2016  ......... H04L 63/1425

OTHER PUBLICATIONS

Bonnie Zhu et al., "SCADA-specific Intrusion Detection/Prevention Systems: A Survey and Taxonomy," Proc. of 1st Workshop on Secure Control Systems, Apr. 2010, 16 pages.
(Continued)

*Primary Examiner* — Sakinah White Taylor
(74) *Attorney, Agent, or Firm* — Sughrue Mion, PLLC

(57) ABSTRACT

An extraction apparatus can obtain a first alert and a second alert that are generated, when an anomaly occurs in a control system, in order to provide notification of the anomaly. The extraction apparatus includes: a classification unit configured to generate association information associating the first alert with the second alert; a learning unit configured to learn a generation pattern of the second alert when the anomaly occurs due to a cause other than a cyber-attack based on the association information generated by the classification unit and a generation pattern of the first alert when the anomaly occurs due to a cause other than a cyber-attack; and an extraction unit configured to extract, from among the second alerts, the second alert generated due to a cyber-attack based on the generation pattern of the second alert that is learned by the learning unit and output the extracted second alert.

10 Claims, 5 Drawing Sheets

(52) U.S. Cl.
CPC ...... *H04L 63/1425* (2013.01); *H04L 63/1466* (2013.01); *H04L 63/20* (2013.01)

(56) References Cited

U.S. PATENT DOCUMENTS

| | | | |
|---|---|---|---|
| 9,215,244 B2* | 12/2015 | Ayyagari | ................... G06F 9/00 |
| 11,240,263 B2* | 2/2022 | Manadhata | ......... H04L 63/1441 |
| 2003/0093514 A1 | 5/2003 | Valdes et al. | |
| 2007/0214503 A1* | 9/2007 | Shulman | ............. H04L 63/1408 |
| | | | 713/188 |
| 2007/0266435 A1* | 11/2007 | Williams | ................ G06F 21/54 |
| | | | 726/22 |
| 2012/0017262 A1* | 1/2012 | Kapoor | ............... H04L 63/1425 |
| | | | 726/1 |
| 2014/0157405 A1* | 6/2014 | Joll | ..................... H04L 63/1425 |
| | | | 726/22 |
| 2017/0013005 A1* | 1/2017 | Galula | .................... H04L 67/12 |
| 2017/0034198 A1* | 2/2017 | Powers | ............... H04L 63/1441 |
| 2017/0171235 A1* | 6/2017 | Mulchandani | ...... H04L 63/1425 |

OTHER PUBLICATIONS

Bela Genge et al., "A Connection Pattern-based Approach to Detect Network Traffic Anomalies in Critical Infrastructures," Proc. of 7th European Workshop on System security (EuroSec'14), 2014, 6 pages.

International Search Report of PCT/JP2017/013588 dated Jul. 4, 2017.

\* cited by examiner

EXTRACTION APPARATUS, EXTRACTION METHOD, COMPUTER READABLE MEDIUM

CROSS-REFERENCE TO RELATED APPLICATIONS

This application is a National Stage of International Application No. PCT/JP2017/013588, filed on Mar. 31, 2017, the disclosure of which is incorporated by reference herein in its entirety.

TECHNICAL FIELD

The present invention relates to an extraction apparatus, an extraction method, and a computer readable medium and, in particular, to an extraction apparatus, an extraction method, and a computer readable medium for extracting an alert that is generated due to a cyber-attack from among alerts that are generated, when an anomaly occurs in a control system, in order to provide notification of the anomaly.

BACKGROUND ART

In recent years, cyber-attacks on control systems have increased. The control system includes, for example, devices such as sensors and actuators, and equipment such as control servers and client terminals, and has characteristics such as adopting a unique Operating System (OS).

However, the control system can fail to apply, on the equipment thereon, a security product which is installed on the OS and used because the control system adopts the unique OS as described above and it has poor specifications, and so on.

Therefore, as a security measure against a cyber-attack on a control system, adoption of a network anomaly detection technique (for example, see Non-Patent Literature 1 and 2), in which traffic (packet) information flowing through the control system is collected and an anomaly that has occurred in the control system is detected based on the collected traffic information, is considered to be effective.

Examples of a system using the network anomaly detection technique include a system for detecting malicious access which is referred to as an Intrusion Detection System (IDS). Examples of the IDS product include SCADAShield (manufactured by Cyberbit Inc.), Silent defense (manufactured by Security Matters Ltd.), and OpShield (manufactured by Wurldtech Security Technologies, Ltd.).

CITATION LIST

Non Patent Literature

Non-patent Literature 1: B. Zhu and S. Sastry, "SCADA-specific Intrusion Detection/Prevention Systems: A Survey and Taxonomy", Proc. of 1st Workshop on Secure Control Systems, April 2010.

Non-patent Literature 2: B. Genge, D. A. Rusu and P. Haller, "A Connection Pattern-based Approach to Detect Network Traffic Anomalies in Critical Infrastructures", Proc. of 7th European Workshop on System security (EuroSec '14), 2014.

SUMMARY OF INVENTION

Technical Problem

Incidentally, in the control system, an anomaly occurs due to a cyber-attack and also occurs due to a cause other than a cyber-attack such as a failure of equipment and a device on the control system, an operation error, and a setting error.

Note that a system using the network anomaly detection technique can detect all the above-mentioned anomalies of the control system and generates, when an anomaly of the control system is detected, an alert in order to provide notification of the anomaly. However, while an alert generated by the system using the network anomaly detection technique includes information such as the occurrence time and location of the anomaly, it is difficult for the receiving side of the alert to determine, using only the information included in the alert, what the cause of the alert is.

For example, the system using the network anomaly detection technique defines a rule for detecting an increase in a frequency of packets (the number of packets per unit time) in order to deal with Denial of Service (DoS) attacks. Consequently, for example, when data is frequently sent from the device due to a failure of the equipment on the control system, it may be determined by the aforementioned rule that there is an anomaly in the control system and an alert may be generated. In this case, the cause of the alert is not a cyber-attack but a failure of the equipment on the control system. However, it is difficult for the receiving side of the alert to determine that the cause of the alert is a failure of the equipment on the control system by using only the information included in the alert.

Further, the system using the network anomaly detection technology defines a rule, in which a list of packets which do not need to be alerted are registered in whitelist, in order to deal with packet data tampering. Consequently, for example, when packets including data of abnormal values are sent to the control server due to a failure of the sensor on the control system, it may be determined by the aforementioned rule that there is an anomaly in the control system, and thus an alert may be generated. In this case, the cause of the alert is not a cyber-attack but a failure of the sensor on the control system. However, it is difficult for the receiving side of the alert to determine that the cause of the alert is a failure of the sensor on the control system by using only the information included in the alert.

When a cyber-attack has been received, fast recovery is required. However, if the system using the network anomaly detection technique generates an alert due to a cyber-attack, the receiving side of the alert cannot determine that the cause of the alert is a cyber-attack by using only the information included in the alert. Consequently, recovery cannot be started immediately, and it is thus difficult to achieve fast recovery.

Accordingly, in order to achieve fast recovery when a cyber-attack has occurred, it is important to extract an alert generated by a cyber-attack from among alerts generated by the system using the network anomaly detection technique. If such an alert can be extracted, the receiving side of the alert can determine that the cause of the alert is a cyber-attack by only receiving the alert. Therefore, recovery can be started immediately, and it is thus possible to achieve fast recovery.

An object of the present invention has been made in view of the aforementioned problems, and aims to provide an extraction apparatus, an extraction method, and a computer readable medium capable of extracting an alert generated due to a cyber-attack.

Solution to Problem

In one aspect, an extraction apparatus capable of obtaining a first alert and a second alert that are generated, when an anomaly occurs in a control system, in order to provide notification of the anomaly, in which the extraction apparatus includes:

a classification unit configured to generate association information associating the first alert with the second alert;

a learning unit configured to learn a generation pattern of the second alert when the anomaly occurs due to a cause other than a cyber-attack based on the association information generated by the classification unit and a generation pattern of the first alert when the anomaly occurs due to a cause other than a cyber-attack; and an extraction unit configured to extract, from among the second alerts, the second alert generated due to a cyber-attack based on the generation pattern of the second alert that is learned by the learning unit and output the extracted second alert.

In one aspect, an extraction method performed by an extraction apparatus capable of obtaining a first alert and a second alert that are generated, when an anomaly occurs in a control system, in order to provide notification of the anomaly, the extraction method including:

a classification step of generating association information associating the first alert with the second alert;

a learning step of learning a generation pattern of the second alert when the anomaly occurs due to a cause other than a cyber-attack based on the association information generated by the classification step and a generation pattern of the first alert when the anomaly occurs due to a cause other than a cyber-attack; and an extraction step of extracting, from among the second alerts, the second alert generated due to a cyber-attack based on the generation pattern of the second alert that is learned by the learning step and outputting the extracted second alert.

In one aspect, a computer readable medium is a non-transitory computer readable medium storing a program for causing a computer capable of obtaining a first alert and a second alert that are generated, when an anomaly occurs in a control system, in order to provide notification of the anomaly to execute:

a classification process of generating association information associating the first alert with the second alert;

a learning process of learning a generation pattern of the second alert when the anomaly occurs due to a cause other than a cyber-attack based on the association information generated by the classification process and a generation pattern of the first alert when the anomaly occurs due to a cause other than a cyber-attack; and an extraction process of extracting, from among the second alerts, the second alert generated due to a cyber-attack based on the generation pattern of the second alert that is learned by the learning process and outputting the extracted second alert.

Advantageous Effects of Invention

The above-described aspects can achieve an effect that a second alert generated due to a cyber-attack can be extracted.

DESCRIPTION OF EMBODIMENTS

Hereinafter, example embodiments of the present invention will be explained with reference to the drawings.

It is assumed in the example embodiments that as an alert that has generated, when an anomaly has occurred in a control system, in order to provide notification of the anomaly, two types of alerts which are a system alert (a first alert. Hereinafter appropriately referred to as a "SA" in the figure.) and an additional traffic alert (a second alert. Hereinafter appropriately referred to as a "TA" in the figure.) can be obtained.

A system alert is an alert which can be obtained as a standard without modifying the existing control system. In other words, the system alert is an alert that the control system itself generates, when detecting an anomaly that has occurred therein, in order to provide notification of the anomaly.

On the other hand, an additional traffic alert is an alert which can be newly obtained by adding a system later without affecting the existing control system. In other words, the additional system alert is an alert that the system, which is added to the control system and is a system other than the control system, generates, when detecting an anomaly that has occurred in the control system, in order to provide notification of the anomaly. For example, the additional traffic alert is an alert that a system (such as an IDS) using the network anomaly detection technique, which is added to the control system, generates in order to provide notification of an anomaly that has occurred in the control system. More specifically, an alert that SCADAShield (manufactured by Cyberbit Inc.), Silent defense (manufactured by Security Matters Ltd.), OpShield (manufactured by Wurldtech Security Technologies, Ltd.), and the like listed above as IDS products generate in order to provide notification of an anomaly that has occurred in the control system is the additional traffic alert.

Figure 1:
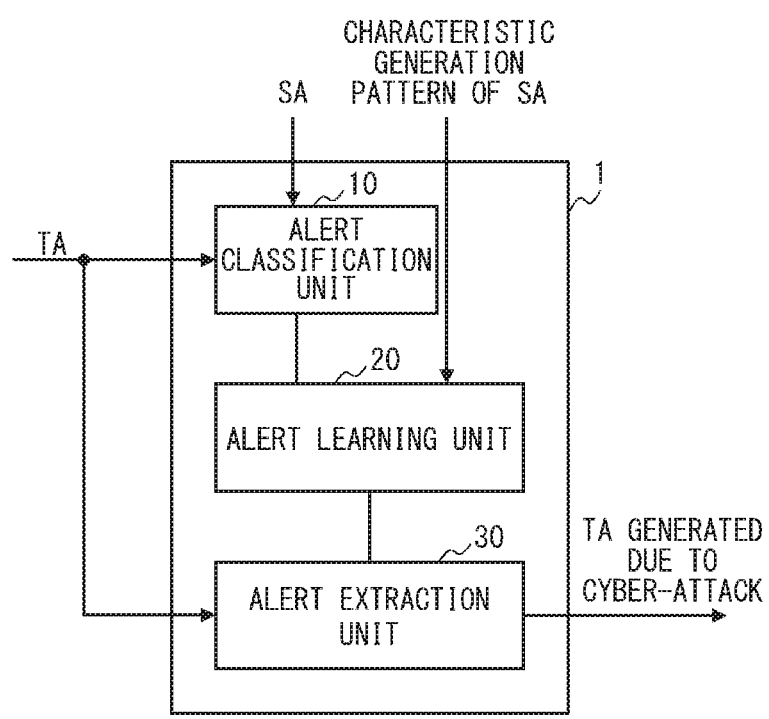
FIG. 1 shows a configuration example of an extraction apparatus according to an example embodiment of the present invention.

FIG. 1 shows a configuration example of an extraction apparatus 1 according to this example embodiment. As shown in FIG. 1, the extraction apparatus 1 according to this example embodiment includes an alert classification unit 10, an alert learning unit 20, and an alert extraction unit 30. As described above, the extraction apparatus 1 according to this example embodiment can obtain two types of alerts: a system alert and an additional traffic alert.

The alert classification unit 10 receives, when a system alert and an additional traffic alert are generated in order to provide notification of an anomaly that has occurred in a control system, the system alert and the additional traffic alert. The system alert is received from, for example, the control system. The additional traffic alert is received from, for example, a system (such as an IDS) using the network anomaly detection technique.

The alert classification unit 10 generates association information associating the system alert with the additional traffic alert.

Specifically, the alert classification unit 10 estimates the system alert and the additional traffic alert which are generated due to the same cause, and generates association information associating the estimated system alert with the estimated additional traffic alert. Then, the alert classification unit 10 outputs the generated association information to the alert learning unit 20. For example, the alert classification unit 10 generates association information based on the following information.

(a) Occurrence Time of Anomaly

A system alert and an added traffic alert include information about the occurrence time of an anomaly that has occurred in a control system.

Thus, the alert classification unit 10 estimates the system alert and the additional traffic alert which have been generated due to the same cause based on the information about the occurrence time of the anomaly included in the system alert and the additional traffic alert.

For example, the alert classification unit 10 estimates that the system alert and the additional traffic alert which have been generated during a predetermined period are alerts generated due to the same cause, and generates association information associating the alerts with each other.

(b) Occurrence Location of Anomaly

A system alert and an additional traffic alert include information about the occurrence location of an anomaly that has occurred in a control system. For example, the information includes a source (src) Internet Protocol (IP) address and a destination (dst) IP address of packets in which the anomaly has occurred, and an equipment Identifier (ID) of equipment in which the anomaly has occurred.

Thus, the alert classification unit 10 estimates the system alert and the additional traffic alert which have been generated due to the same cause based on the information about the occurrence location of the anomaly included in the system alert and the additional traffic alert.

For example, the alert classification unit 10 estimates that the system alert and the additional traffic alert which have been generated at the same location are alerts generated due to the same cause, and generates association information associating the alerts with each other.

(c) Type of Anomaly

A system alert and an additional traffic alert include information about the type of an anomaly that has occurred in a control system. Examples of the type of an anomaly included in the system alert include that a data value is abnormal (a graph is abnormal), a process regularity is abnormal, a message is delayed, a control command is not registered in whitelist, and a control command is registered in blacklist. Further, examples of the type of an anomaly included in the additional traffic alert include that an outlier of a data value is detected, anomalies in a control command and communication regularity are detected, traffic is not registered in whitelist, and traffic is registered in blacklist.

Thus, the alert classification unit 10 estimates the system alert and the additional traffic alert which have been generated due to the same cause based on the information about the type of the anomaly included in the system alert and the additional traffic alert.

For example, the alert classification unit 10 estimates that the causes of generation of the system alert including information about the type of the anomaly indicating that the data value exceeds an allowable value and the additional traffic alert including information about the type of the anomaly indicating that an outlier of the data value is detected are the same as each other (e.g., a failure of the sensor on the control system), and generates association information associating the alerts with each other.

Further, the alert classification unit 10 estimates that the causes of generation of the system alert including information about the type of the anomaly that is a delay of a received message and the additional traffic alert including information about the type of the anomaly that communication regularity is abnormal are the same (e.g., a failure of the equipment on the control system), and generates association information associating the alerts with each other.

Note that the alert classification unit 10 may generate association information using any one of the above-described three pieces of information (a) occurrence time of anomaly, (b) occurrence location of anomaly, and (c) type of anomaly, and alternatively, it may generate association information using any two or more pieces of information from among these three pieces of information.

Figure 2:
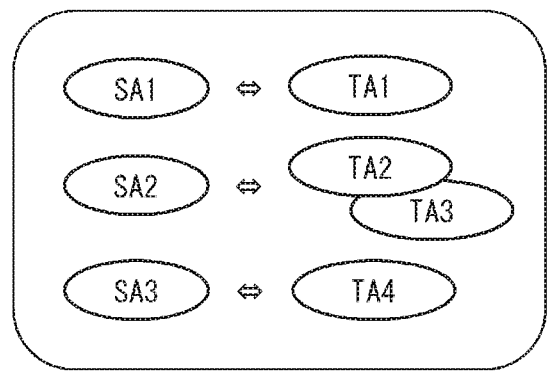
FIG. 2 shows an example of association information generated by an alert classification unit shown in FIG. 1.

FIG. 2 shows an example of association information generated by the alert classification unit 10. In the example of FIG. 2, it is estimated that a system alert SA1 and an additional traffic alert TA1 are generated due to the same cause, and thus they are associated with each other. Similarly, it is estimated that a system alert SA2 and additional traffic alerts TA2 and TA3 are generated due to the same cause, and thus they are associated with each other. Further, it is estimated that a system alert SA3 and an additional traffic alert TA4 are generated due to the same cause, and thus they are associated with each other.

Association information generated by the alert classification unit 10 and information on a generation pattern of the system alert indicating a characteristic generation pattern of the system alert when an anomaly occurs in the control system due to a cause other than a cyber-attack are input to the alert learning unit 20. The information on the generation pattern of the system alert may be input from a system alert analysis unit (not shown) which analyzes a system alert, or may be manually input by a user.

Figure 3:
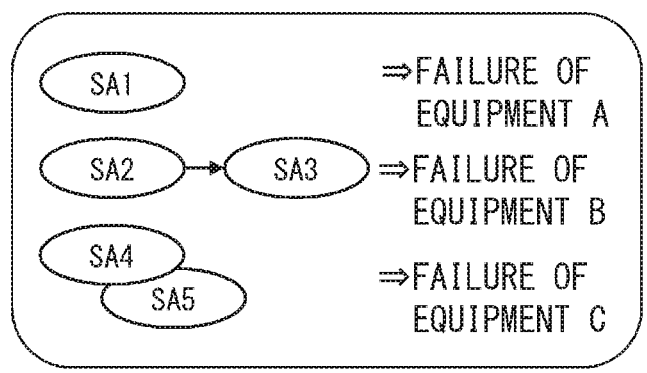
FIG. 3 shows an example of information on a generation pattern of a system alert input to an alert learning unit shown in FIG. 1.

FIG. 3 shows an example of information on a generation pattern of a system alert input to the alert learning unit 20. FIG. 3 shows a characteristic generation pattern of the system alert when a failure of equipment on a control system occurs. In the example of FIG. 3, the system alert SA1 is generated when equipment A fails. Further, when equipment B fails, the system alert SA2 is generated, and subsequently the system alert SA3 is generated. Further, when equipment C fails, the system alerts SA4 and SA5 are simultaneously generated.

The alert learning unit 20 learns a generation pattern of the additional traffic alert when an anomaly occurs in the control system due to a cause other than a cyber-attack based on association information generated by the alert classification unit 10 and information on a generation pattern of the system alert.

Specifically, the alert learning unit 20 replaces, based on the association information, the system alert in the characteristic generation pattern of the system alert indicated by the information on the generation pattern of the system alert with the additional traffic alert associated with that system alert. In this way, the alert learning unit 20 performs the aforementioned learning. Then, the alert learning unit 20 generates information on the generation pattern of the additional traffic alert indicating the result of the aforementioned learning, and outputs the generated information on the generation pattern of the additional traffic alert to the alert extraction unit 30.

Figure 4:
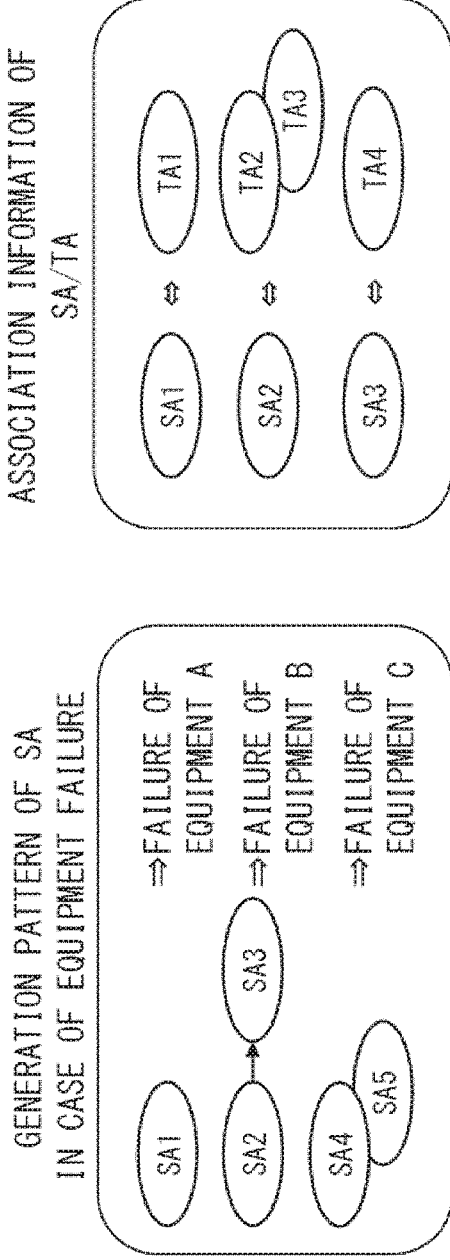
FIG. 4 shows an example of a learning operation of the alert learning unit shown in FIG. 1.
Figure 4:
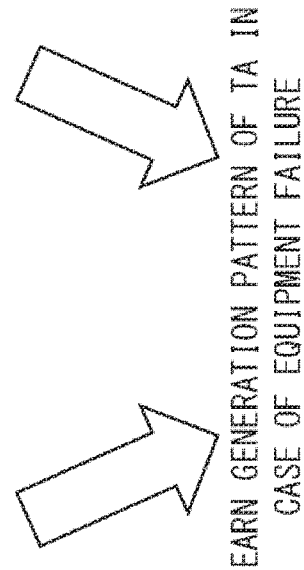

FIG. 4 shows an example of a learning operation of the alert learning unit 20. In this example, association information shown in FIG. 2 and information on the generation pattern of the system alert shown in FIG. 3 are input to the alert learning unit 20.

In the example of FIG. 4, the information on the generation pattern of the system alert indicates that the system alert SA1 is generated when the equipment A on the control system fails. Further, the association information indicates that the system alert SA1 is associated with the additional traffic alert TA1. Thus, the alert learning unit 20 replaces the system alert SA1 in the information on the generation pattern of the system alert with the additional traffic alert TA1, and learns that the additional traffic alert TA1 is generated when the equipment A on the control system fails.

Further, in the example of FIG. 4, the information on the generation pattern of the system alert indicates that when the equipment B on the control system fails, the system alert SA2 is generated and subsequently the system alert SA3 is generated. Further, the association information indicates that the system alert SA2 is associated with the additional traffic alerts TA2 and TA3, and that the system alert SA3 is associated with the additional traffic alert TA4. Thus, the alert learning unit 20 replaces the system alert SA2 in the information on the generation pattern of the system alert with the additional traffic alerts TA2 and TA3 and replaces the system alert SA3 with the additional traffic alert TA4, and learns that when the equipment B on the control system fails, the additional traffic alerts TA2 and TA3 are simultaneously generated and subsequently the additional traffic alert TA4 is generated.

The alert extraction unit 30 receives, when an additional traffic alert is generated in order to provide notification of an anomaly that has occurred in the control system, the additional traffic alert. The additional traffic alert is received from, for example, a system (such as an IDS) using the network anomaly detection technique. Further, the alert extraction unit 30 receives information on a generation pattern of the additional traffic alert generated by the alert learning unit 20.

The alert extraction unit 30 extracts the additional traffic alert generated due to a cyber-attack from the generated additional traffic alerts based on the generation pattern of the additional traffic alert indicated by the information on the generation pattern of the additional traffic alert.

Specifically, the alert extraction unit 30 determines whether the generated additional traffic alert matches the generation pattern of the additional traffic alert indicated by the information on the generation pattern of the additional traffic alert. The alert extraction unit 30 determines that among the generated additional traffic alerts, the additional traffic alert which matches the generation pattern of the additional traffic alert indicated by the information on the generation pattern of the additional traffic alert is the additional traffic alert generated due to a cause other than a cyber-attack, and determines that the additional traffic alert which does not match the generation pattern of the additional traffic alert indicated by the information on the generation pattern of the additional traffic alert is the additional traffic alert generated due to a cyber-attack.

For example, it is assumed that the information on the generation pattern of the additional traffic alert indicates the generation pattern of the additional traffic alert shown in the lower part of FIG. 4. In this case, when the additional traffic alert TA1 is generated, the alert extraction unit 30 determines that the generated additional traffic alert TA1 is the additional traffic alert generated due to a cause other than a cyber-attack (in this case, a failure of the equipment A on the control system). Further, when the additional traffic alerts TA2 and TA3 are simultaneously generated and subsequently the additional traffic alert TA4 is generated, the alert extraction unit 30 determines that the generated additional traffic alerts TA2, TA3 and TA4 are the additional traffic alerts generated due to a cause other than a cyber-attack (in this case, a failure of the equipment B on the control system). On the other hand, when another additional traffic alert is generated, the alert extraction unit 30 determines that the other additional traffic alert is the additional traffic alert generated due to a cyber-attack. For example, when the additional traffic alerts TA2 and TA3 are not generated simultaneously but instead independently of each other, the alert extraction unit 30 determines that the generated additional traffic alerts TA2 and TA3 are the additional traffic alerts generated due to a cyber-attack. Further, even if the additional traffic alert TA4 is generated, when the additional traffic alerts TA2 and TA3 have not been simultaneously generated before the generation of the additional traffic alert TA4, the alert extraction unit 30 determines that the generated additional traffic alert TA4 is the additional traffic alert generated due to a cyber-attack.

Then, the alert extraction unit 30 discards the additional traffic alert generated due to a cause other than a cyber-attack. On the other hand, the alert extraction unit 30 extracts the additional traffic alert generated due to a cyber-attack, and outputs the extracted additional traffic alert to the outside of the extraction apparatus 1. The output destination of the additional traffic alert is, for example, an Industrial Control System (ICS) and a Security Operation Center (SOC) which deal with recovery when a cyber-attack has occurred.

In this way, the alert extraction unit 30 extracts and outputs the additional traffic alert generated due to a cyber-attack. Accordingly, the receiving side of the additional traffic alert (for example, an ICS or a SOC) can determine that the cause of the additional traffic alert is a cyber-attack by only receiving the additional traffic alert. Therefore, recovery can be started immediately, and it is thus possible to achieve fast recovery.

A processing procedure of the extraction apparatus 1 according to this example embodiment will be explained hereinafter.

Figure 5:
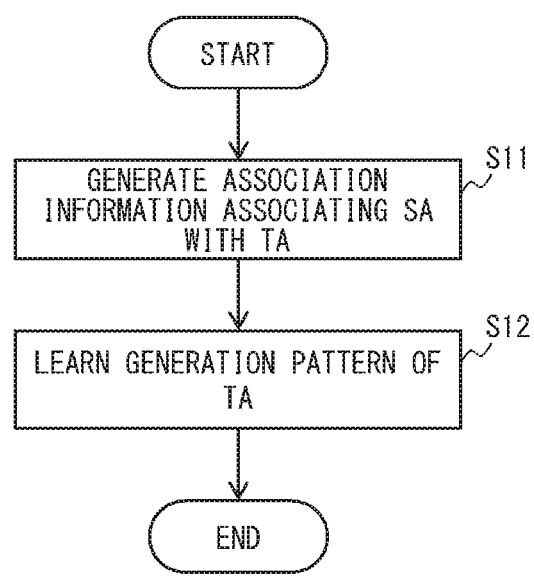
FIG. 5 is a flowchart showing a processing procedure until the time when a learning operation is performed in the extraction apparatus shown in FIG. 1.

FIG. 5 is a flowchart showing the processing procedure until the time when a learning operation is performed in the extraction apparatus 1 according to this example embodiment.

As shown in FIG. 5, first, the alert classification unit 10 generates association information associating a system alert with an additional traffic alert (Step S11). Specifically, the alert classification unit 10 estimates the system alert and the additional traffic alert which have been generated due to the same cause and generates association information associating the estimated system alert with the estimated additional traffic alert.

Subsequently, the alert learning unit 20 learns a generation pattern of the additional traffic alert when an anomaly occurs in the control system due to a cause other than a cyber-attack based on the association information generated by the classification unit 10 and a characteristic generation pattern of the system alert when an anomaly occurs due to a cause other than a cyber-attack (Step S12). Specifically, the alert learning unit 20 replaces, based on the association information, the system alert in the characteristic generation pattern of the system alert with the additional traffic alert associated with that system alert. In this way, the alert learning unit 20 performs the aforementioned learning.

Note that the processing procedure shown in FIG. 5 may be performed when at least one of the system alert and the additional traffic alert are generated or may be performed periodically.

Figure 6:
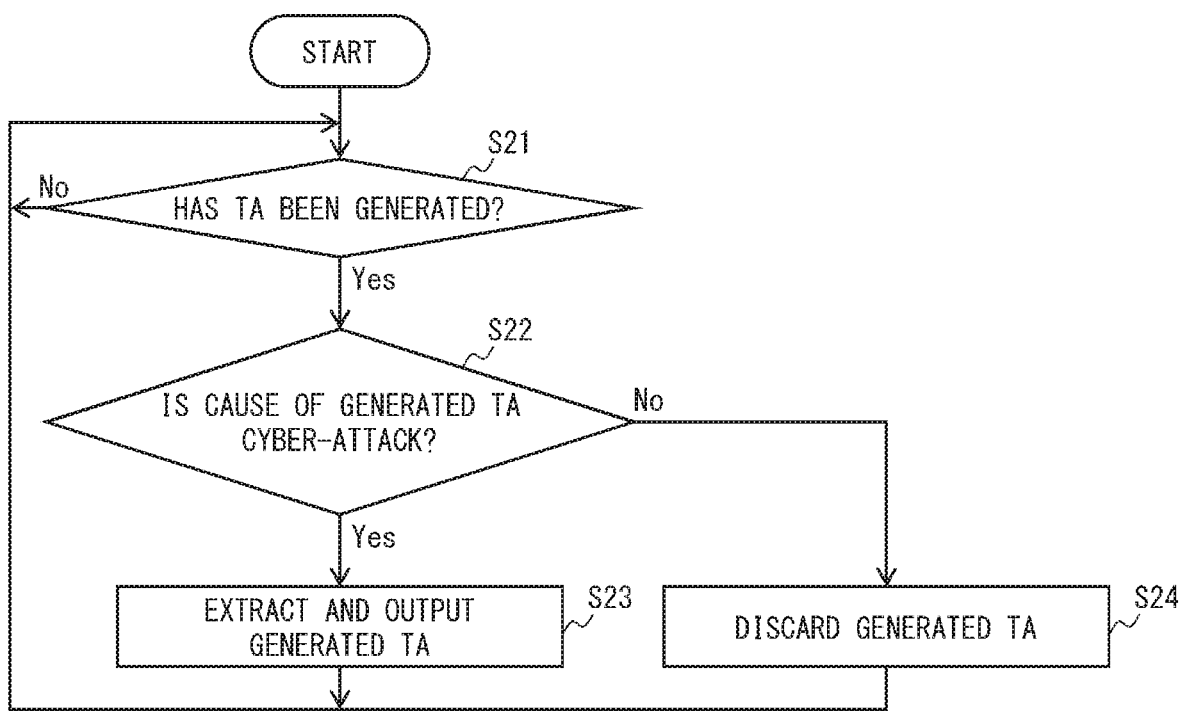
FIG. 6 is a flowchart showing an example of a processing procedure when an additional traffic alert is generated in the extraction apparatus shown in FIG. 1.

FIG. 6 is a flowchart showing an example of a processing procedure when an additional traffic alert is generated in the extraction apparatus 1 according to this example embodiment.

As shown in FIG. 6, the alert extraction unit 30 determines whether an additional traffic alert is generated (Step S21).

In Step S21, when the additional traffic alert is generated (Yes in Step S21), the alert extraction unit 30 determines whether the generated additional traffic alert is the additional traffic alert generated due to a cyber-attack (Step S22). Specifically, the alert extraction unit 30 determines whether the generated additional traffic alert matches the generation pattern of the additional traffic alert learned by the alert learning unit 20. The alert extraction unit 30 determines that among the generated additional traffic alerts, the additional traffic alert which matches the generation pattern of the additional traffic alert is the additional traffic alert generated due to a cause other than a cyber-attack, and determines that the additional traffic alert which does not match the generation pattern of the additional traffic alert is the additional traffic alert generated due to a cyber-attack.

In Step S22, when the generated additional traffic alert is the additional traffic alert generated due to a cyber-attack (Yes in Step S22), the alert extraction unit 30 extracts and outputs the generated additional traffic alert (Step S23). After that, the process returns to Step S21.

On the other hand, in Step S22, when the generated additional traffic alert is not the additional traffic alert generated due to a cyber-attack (No in Step S22), the alert extraction unit 30 discards the generated additional traffic alert (Step S24). After that, the process returns to Step S21.

Note that it is assumed that the generation pattern of the additional traffic alert learned by the alert learning unit 20 is the generation pattern on the lower part of FIG. 4. In this case, in Step S22, for example, even if the additional traffic alerts TA2 and TA3 are generated simultaneously, the alert extraction unit 30 does not make a determination on the additional traffic alerts TA2 and TA3 immediately and waits until the additional traffic alert TA4 is generated later. Then, when the additional traffic alert TA4 is generated within a predetermined time, it is determined that the additional traffic alerts TA2, TA3 and TA4 are the additional traffic alerts generated due to a cause other than a cyber-attack. On the other hand, when the additional traffic alert TA4 is not generated within a predetermined time, it is determined that the additional traffic alerts TA2 and TA3 are the additional traffic alerts generated due to a cyber-attack.

As described above, according to the extraction apparatus 1 of this example embodiment, the alert classification unit 10 generates association information associating the system alert with the additional traffic alert. The alert learning unit 20 learns a generation pattern of the additional traffic alert when an anomaly occurs in the control system due to a cause other than a cyber-attack based on the association information generated by the classification unit 10 and a generation pattern of the system alert when an anomaly occurs due to a cause other than a cyber-attack. The alert extraction unit 30 extracts the additional traffic alert generated due to a cyber-attack from among the generated additional traffic alerts based on the generation pattern of the additional traffic alert learned by the alert learning unit 20 and outputs the extracted alert.

Accordingly, the receiving side of the additional traffic alert (for example, an ICS or a SOC) can determine that the cause of the additional traffic alert is a cyber-attack by only receiving the additional traffic alert. Therefore, recovery can be started immediately, and it is thus possible to achieve fast recovery.

Various aspects of the present invention have been explained above with reference to the example embodiments. However, the present invention is not limited to the aforementioned example embodiments. Various changes that can be understood by those skilled in the art can be made to the configuration and the details of each aspect of the present invention without departing from the scope of the invention.

For example, each configuration in the above example embodiment may be achieved by hardware or software, or both of them, and may be achieved by one piece of hardware or software, or a plurality of pieces of hardware or software. The function (processing) of each apparatus may be achieved by a computer including a Central Processing Unit (CPU), a memory, and the like. For example, a program for performing the extraction method in the example embodiment may be stored in a storage device, thereby achieving each of the functions by executing the program stored in the storage device by the CPU.

The above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

REFERENCE SIGNS LIST

1 EXTRACTION APPARATUS
10 ALERT CLASSIFICATION UNIT
20 ALERT LEARNING UNIT
30 ALERT EXTRACTION UNIT

The invention claimed is:

1. An extraction apparatus capable of obtaining a first alert and a second alert that are generated, when an anomaly occurs in a control system, in order to provide notification of the anomaly, wherein the extraction apparatus comprises:
at least one memory storing one or more instructions; and
at least one processor configured to execute to one or more instruction to:
generate association information associating the first alert with the second alert;
learn a generation pattern of the second alert when the anomaly occurs due to a cause other than a cyber-attack based on the association information generated by the at least one processor and a generation pattern of the first alert when the anomaly occurs due to a cause other than a cyber-attack; and extract, from among the second alerts, the second alert generated due to a cyber-attack based on the generation pattern of the second alert that is learned by the at least one processor and output the extracted second alert, wherein the at least one processor is further configured to perform the learning by replacing the first alert in the generation pattern of the first alert when the anomaly occurs due to a cause other than the cyber-attack with the second alert associated with the first alert based on the association information.

2. The extraction apparatus according to claim 1, wherein the at least one processor is further configured to estimate the first alert and the second alert that have been generated due to the same cause and generate the association information associating the estimated first alert with the estimated second alert.

3. The extraction apparatus according to claim 2, wherein the cat least one processor is further configured to estimate the first alert and the second alert that have been generated due to the same cause based on information about the occurrence time of the anomaly included in the first alert and the second alert.

4. The extraction apparatus according to claim 2, wherein the at least one processor is further configured to estimate the first alert and the second alert that have been generated due to the same cause based on information about the occurrence location of the anomaly included in the first alert and the second alert.

5. The extraction apparatus according to claim 2, wherein the at least one processor is further configured to estimate the first alert and the second alert that have been generated due to the same cause based on information about the type of the anomaly included in the first alert and the second alert.

6. The extraction apparatus according to claim 1, wherein the at least one processor is further configured to:

determine that among the second alerts, the second alert that matches the generation pattern of the second alert learned by the at least one processor is the second alert generated due to a cause other than the cyber-attack, and determine that among the second alerts, the second alert that does not match the generation pattern of the second alert learned by the at least one processor is the second alert generated due to a cyber-attack.

7. The extraction apparatus according to claim 1, wherein the at least one processor is further configured to discard the second alert generated due to a cause other than the cyber-attack.

8. The extraction apparatus according to claim 1, wherein the first alert is an alert that the control system itself generates, when an anomaly occurs in the control system, in order to provide notification of the anomaly, and the second alert is an alert that a system other than the control system generates, when an anomaly occurs in the control system, in order to provide notification of the anomaly.

9. An extraction method performed by an extraction apparatus capable of obtaining a first alert and a second alert that are generated, when an anomaly occurs in a control system, in order to provide notification of the anomaly, the extraction method comprising:

a classification step of generating association information associating the first alert with the second alert;

a learning step of learning a generation pattern of the second alert when the anomaly occurs due to a cause other than a cyber-attack based on the association information generated by the classification step and a generation pattern of the first alert when the anomaly occurs due to a cause other than a cyber-attack; and an extraction step of extracting, from among the second alerts, the second alert generated due to a cyber-attack based on the generation pattern of the second alert that is learned by the learning step and outputting the extracted second alert, wherein the learning operation is performed by replacing the first alert in the generation pattern of the first alert when the anomaly occurs due to a cause other than the cyber-attack with the second alert associated with the first alert based on the association information.

10. A non-transitory computer readable medium storing a program for causing a computer capable of obtaining a first alert and a second alert that are generated, when an anomaly occurs in a control system, in order to provide notification of the anomaly to execute:

a classification process of generating association information associating the first alert with the second alert;

a learning process of learning a generation pattern of the second alert when the anomaly occurs due to a cause other than a cyber-attack based on the association information generated by the classification process and a generation pattern of the first alert when the anomaly occurs due to a cause other than a cyber-attack; and an extraction process of extracting, from among the second alerts, the second alert generated due to a cyber-attack based on the generation pattern of the second alert that is learned by the learning process and outputting the extracted second alert, wherein the learning process is performed by replacing the first alert in the generation pattern of the first alert when the anomaly occurs due to a cause other than the cyber-attack with the second alert associated with the first alert based on the association information.

* * * * *